Feb. 13, 1968       F. C. KARASINSKI, JR       3,368,585
FRICTION DRIVE MECHANISM
Filed March 29, 1965

INVENTOR
FRANK C. KARASINSKI, Jr.
BY Walter Potoroka, Sr.
ATTORNEY

United States Patent Office 3,368,585
Patented Feb. 13, 1968

3,368,585
FRICTION DRIVE MECHANISM
Frank C. Karasinski, Jr., Utica, Mich., assignor to Holley Carburetor Company, Warren, Mich., a corporation of Michigan
Filed Mar. 29, 1965, Ser. No. 443,405
12 Claims. (Cl. 137—636)

This invention relates generally to friction drive mechanisms, and more particularly to a friction clutch mechanism particularly suited for a limited drive application.

A need has arisen for a friction clutch mechanism capable of maintaining a substantially constant torque output or load on an associated element, such as a valve, for example, regardless of the wear which may occur in the clutch components.

Accordingly, a primary object of the invention is to provide a mechanism which meets this requirement.

Another object of the invention is to provide such a mechanism which is compact, efficient and inexpensive.

Other objects and advantages of the invention will become more apparent when reference is made to the following specification and the accompanying drawing wherein.

Figure 1:
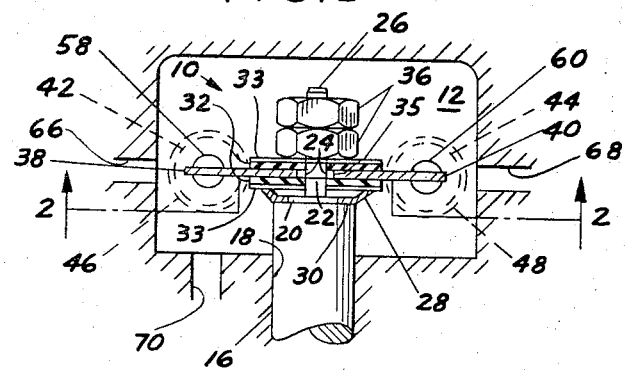
FIGURE 1 is a side elevational view, in partial cross-section, of a clutch mechanism embodying the invention.

Referring now to the drawings in greater detail, FIGURE 1 illustrates a friction clutch mechanism 10 mounted in a chamber 12 formed in some suitable housing 14. The friction clutch mechanism 10 includes a rotatable input drive member or shaft 16 extending through an opening 18 formed in a wall of the housing 14. The end of the rotatable member 16 within the chamber 12 is formed to include a small diameter portion 20 and a still smaller diameter portion 22. Opposing parallel flats 24 are formed along the full length of the smaller diameter portion 22, and the extreme end 26 of the smaller diameter portion 22 is threaded for a predetermined length thereof.

A resilient means, such as a "Belleville" washer 28, is mounted around the smaller diameter portion 20 against the face 30 formed on the rotatable member 16. A pair of friction disks 32 are mounted on the smaller diameter portion 22, disks 32 being formed at their centers to fit the flats 24. Each of the disks 32 may be bonded to a steel or other metal back-up plate 33 for high torque applications. An actuator member 34 having a full round center opening 35 is loosely mounted around the smaller diameter portion 22 between the friction disks 32. A fastening means, such as a pair of nuts 36, is threaded onto the threaded end 26 of the rotatable member 16, against one of the friction members 32, or its back-up plate 33, if there is one. It is apparent that the driven actuator or output member 34 is confined between the friction disks 32, and the Belleville washer 28 may be compressed against the face 30 by the other of the disks 32, to produce a predetermined torque relationship between the actuator member 34 and the friction disks 32.

A pair of arms or extensions 38 and 40 are formed on the actuator member 34. A pair of valves 42 and 44, mounted in chambers 46 and 48, are urged against their respective seats 50 and 52, by springs 54 and 56, respectively. The seats 50 and 52 are formed by the openings 58 and 60, which communicate between the chamber 12 and the chambers 46 and 48, respectively. Extensions 62 and 64, formed on the valves 42 and 44, respectively, extend through the openings 58 and 60, respectively, into the chamber 12 adjacent the arms 38 and 40.

Passages 66 and 68 communicate with the chambers 46 and 48, respectively. An additional opening 70 may be formed in a wall of the housing 14, serving as an inlet for fluid from any suitable high pressure source (not shown).

Operation

Before discussing the operation of the friction clutch mechanism in detail, it is deemed important to first describe the characteristics of and the relationship between the Belleville spring washer 28 and the friction disks 32/33.

It would seem that the resilient means 28 could comprise any one of various types of springs, including wave washers, etc. However, where space is limited, experimentation has shown that a "Belleville" spring washer is best, provided it has been preloaded prior to being assembled. By preloading is meant that the washers, prior to assembly, are compressed completely flat one time in order to effect and thus eliminate any initial set.

Figure 3:
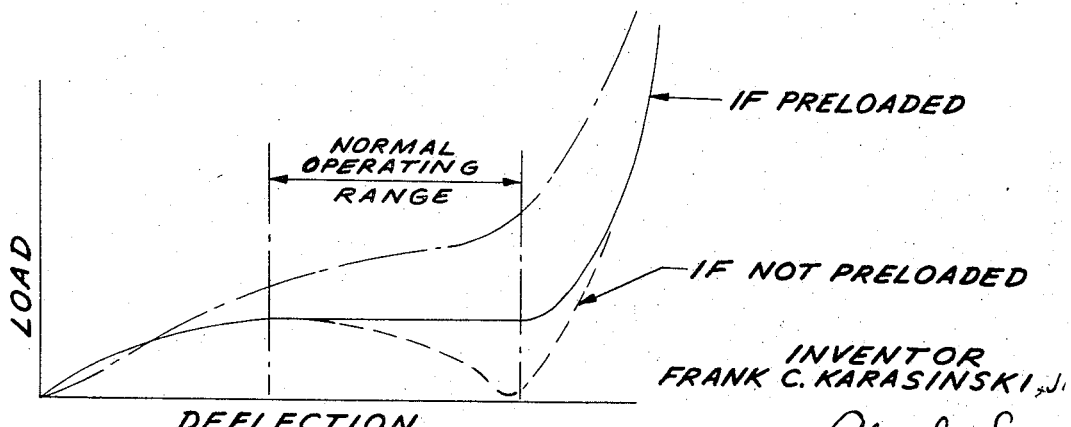
FIGURE 3 is a graph illustrating an important characteristic of the invention.

By referring to FIGURE 3, it may be noted that if the washer has been preloaded, a substantially flat portion along the Load v. Deflection curve results, which may serve ideally as the normal operating range for a particular washer. Where no preloading has been performed, it will be noted that the Load v. Deflection curve will dip, as shown by the dash line, resulting in a distorted operating range.

It will also be observed in FIGURE 3 that a typical Load v. Deflection curve for a wave washer is along the dot-dash line. Obviously, there is no substantially flat range wherein the washer height could change due to wear or other reasons, without there resulting in a considerable change in torque output or face load between the friction disks 32 and the actuating member 34. Furthermore, preloading a wave washer does not eliminate the initial set problem.

While no special equipment is required to assemble the friction clutch mechanism 10, once the components are mounted on the shaft 16 in the relative locations illustrated in FIGURE 1, the first nut 36 is tightened until a marked increase in wrench torque is noted. In other words, there will have been an increase in load or reaction during the initial turning of the wrench, followed by a somewhat constant load, i.e., across the flat portion of the solid line curve of FIGURE 3, and then a sudden increase in load. At this point, the nut is backed off a few degrees and then locked in place by use of a second nut 36.

Insofar as the friction disks 32 are concerned, for low torque applications, the disks 32 may consist of various materials such as Pyrotex (a combination of asbestos fibers and a phenolic plastic), asbestos cellulose, various MiCartas (a phenolic plastic with variable base materials), Polypropylene, and any one of a group of metals, including aluminum, copper, brass, porous bronze and steel.

Where high torque output requirements must be met, tests have indicated that the ideal disk comprises Pyrotex bonded onto a steel backup-washer.

This combination substantially eliminates errors due to warpage of mating metal pieces, poor matching of contact surfaces, poor friction coefficients, and cold flow characteristics.

In summary, the use of Pyrotex disks bonded onto steel washers and retained on the smaller diameter portion 22 of the shaft 16 in such a manner that the disks 32/33 must rotate with the shaft, coupled with a suitable "preloaded" Belleville spring washer, will produce the above described substantially constant Load v. Deflection operating range.

While the friction clutch mechanism 10 may be embodied in a variety of applications, for illustrative purposes, it is being used to actuate a pair of valves 42 and 44 in a manner such that high pressure fluid, supplied to the chamber 12 via the passageway 70, is caused to flow past either the valve 42 or the valve 44 and out through one of their respective passages 66 and 68 for any suitable purpose.

In operation, the rotatable member 16 is turned, either manually or otherwise, in, say, a clockwise direction. The friction clutch mechanism will rotate the arm 40 into contact with the extension 64, causing the valve 44 to move away from the seat 52, against the force of the spring 56. Once valve 44 has reached the end of its opening movement, rotation of the actuating member 34 with shaft 16 is stopped, and further rotational movement of the member 16 will cause the friction disks 32 to slip on the opposite surfaces of the actuating member 34. The slip torque is dependent upon the design of the resilient means 28 and the particular disk 32 material, as previously explained.

Figure 2:
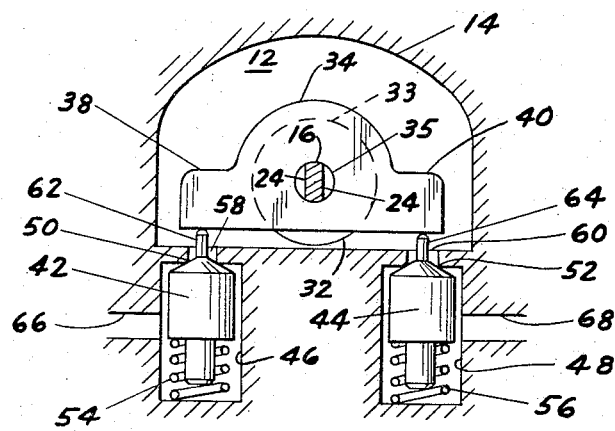
FIGURE 2 is a cross-sectional view taken along the plane of the line 2—2 of FIGURE 1, as if FIGURE 1 were a full-elevational view, and looking in the direction of the arrows.

With the valve 44 in its open position, high pressure fluid from the chamber 12 will flow through the openings 60 into the chamber 48 and out through the passage 68. Once force is no longer being applied to the rotatable member 16, the spring 56 will urge the valve 44 upwardly in FIGURE 2 against its seat 52. This will cause the arm 40, the associated disks 32 and the member 16 to be rotated a relatively small amount in a counterclockwise direction, to a relaxed position, substantially as shown in FIGURE 2. Obviously, rotation of the member 16 in a counterclockwise direction would cause the valve 42 to be opened in the same maner as that described relative to valve 44.

From the above discussion, it should be apparent that the invention comprises a unique friction clutch means for acutating one or the other of a pair of valves, thereby permitting high pressure fluid to flow in a particular direction, as to one side or the other of a slave piston, for example, whose lateral movement actuates some device.

It should also be apparent that the shaft 16 may continue to be rotated any number of revolutions in one direction with the predetermined torque output remaining constant, by virtue of the unique frictional relationship between the disks 32 and the member 34, and with the proper design and compression of the spring washer 28.

It should be further apparent that the actuator arms 38 and 40 may be used to contact electrical switches or other devices, in lieu of the valves 42 and 44.

While but one embodiment of the invention has been shown and described, it is apparent that other modifications of the invention are possible within the scope of the appended claims.

What I claim as my invention is:

1. A friction clutch mechanism comprising an input shaft; a pair of friction members fixedly secured to rotate with said shaft; an output member mounted freely on said shaft and confined between said friction members; resilient means confined between the outer face of one of said friction members and an abutment formed on said shaft; means for holding said pair of friction members, said output member and said resilient means together in a predetermined torque relationship; and an element positioned adjacent said output member, said element being at times contacted by said output member.

2. A device as described in claim 7, wherein said resilient means is a spring washer.

3. A device as described in claim 1, wherein said resilient means is a "Belleville" type spring washer.

4. A friction clutch mechanism comprising an input shaft; a pair of friction members fixedly secured to rotate with said shaft; an output member mounted freely on said shaft and confined between said friction members; resilient means confined between the outer face of one of said friction members and an abutment formed on said shaft; means for holding said pair of friction members and said output member together, against said resilient means, so as to stress said resilient means a predetermined amount; and an element positioned adjacent said output member, said element being at times contacted by said output member.

5. A friction clutch mechanism, comprising an input shaft; a pair of friction members fixedly secured to rotate with said shaft; an output member mounted freely on said shaft and confined between said friction members; actuating means operatively connected to said output member; a spring washer confined between the outer face of one of said friction members and an abutment formed on said shaft; a fastening means for holding said pair of friction members, said output member, and said spring washer together in a predetermined torque relationship; and an element positioned adjacent said actuating means, said element being at times influenced by said actuating means.

6. A friction clutch mechanism, comprising a drive member; a pair of friction disks fixedly secured to move with said drive member; an actuator member mounted free said drive member and confined between said friction disks, said actuator member having an arm extending therefrom; a spring confined between the outer face of one of said friction disks and an abutment formed on said drive member; fastening means for holding said pair of friction disks, said actuator member, and said spring together in a predetermined torque relationship; and a movable element positioned adjacent said arm of said actuator member, said movable element being at times actuated by said arm.

7. A device as described in claim 6, wherein each of said friction disks includes a metal plate bonded to one side thereof.

8. A device as described in claim 6, wherein said spring is a spring washer.

9. A friction clutch mechanism, comprising a rotatable drive member; a pair of friction disks fixedly secured to rotate with said drive member; an actuator member mounted freely on said drive member and confined between said friction disks, said actuator member having a pair of arms extending therefrom; a spring washer confined between the outer face of one of said friction disks and a face formed on said rotatable member; a fastening means for holding said pair of friction disks, said actuator member, and said spring washer together in a predetermined torque relationship; and a movable element positioned adjacent each of said pair of arms of said actuator member, said movable elements being alternately actuated by said arms.

10. A friction clutch mechanism, comprising a rotatable drive member; a pair of friction disks fixedly secured to rotate with said drive member; an actuator mounted freely on said drive member and confined between said friction disks, said actuator having a pair of members formed thereon; a Belleville spring washer confined between the outer face of one of said friction disks and a face formed on said drive member; fastening means for holding said pair of friction disks, said actuator, and said Belleville spring washer together in a predetermined torque relationship; and a valve element positioned adjacent each of said pair of members formed on said actuator, said valve elements being alternately actuated by said pair of members.

11. A friction clutch mechanism, comprising a rotatable input drive member having a plurality of diameters formed thereon; a pair of opposing flats formed along a portion of the smallest of said plurality of diameters, threads formed on an end of the smallest diameter portion; a pair of friction disks mounted on said smallest diameter portion, said friction disks each having a center opening formed to accommodate said opposing flats; an actuator member mounted loosely around said smallest diameter portion between said pair of friction disks; a Belleville spring washer mounted on an intermediate diameter and confined between one of said friction disks and the face formed between said intermediate diameter and a larger diameter of said drive member; fastening means threadedly attached to said threaded end of said smallest diameter portion for confining said actuating member between said friction disks and for stressing said Belleville spring washer a predetermined amount; and a movable element positioned adjacent said actuator member, said movable element being at times moved by said actuating member.

12. A friction clutch mechanism, comprising a rotatable input drive member having a plurality of diameters formed along a portion of the smallest of said plurality of diameters, threads formed on an end of the smallest diameter portion; a pair of metal backed friction disks mounted on said smallest diameter portion, said friction disks each having a center opening formed to accommodate said opposing flats; an actuator member mounted loosely around said smallest diameter portion between said pair of friction disks; a Belleville washer mounted on an intermediate diameter and confined between one of said friction disks and the face formed between said intermediate diameter and a larger diameter of said rotatable member; fastening means threadedly attached to said threaded end of said smallest diameter portion for confining said actuating member between said friction disks and for stressing said Belleville washer a predetermined amount; and a valve positioned adjacent said actuator member, said valve being opened by said actuating member upon rotation of said rotatable member, said actuating member slipping past said friction disks once said valve is fully open and while said rotatable member continues to rotate.

References Cited

UNITED STATES PATENTS

| | | | |
|---|---|---|---|
| 2,151,724 | 3/1939 | Wengel | 192—56 X |
| 2,371,855 | 3/1945 | Sunderland | 192—56 |
| 2,722,396 | 11/1955 | Carr | 251—81 |
| 3,158,178 | 11/1964 | Fiala | 137—636 X |
| 3,249,187 | 5/1966 | McDowall | 192—56 X |

CLARENCE R. GORDON, *Primary Examiner.*